US010240712B2

(12) United States Patent
Filipiak et al.

(10) Patent No.: US 10,240,712 B2
(45) Date of Patent: Mar. 26, 2019

(54) BALL MOUNT ASSEMBLY FOR VEHICLE (71) Applicant: Gentex Corporation, Zeeland, MI (US)

(72) Inventors: Kenneth R. Filipiak, West Olive, MI (US); Christopher J. Koleszar, Zeeland, MI (US); Ulrich A. Kuester, Spring Lake, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/862,743

(22) Filed: Jan. 5, 2018

(65) Prior Publication Data

US 2018/0195661 A1  Jul. 12, 2018

Related U.S. Application Data (60) Provisional application No. 62/444,461, filed on Jan. 10, 2017.

(51) Int. Cl.
*B60R 1/04* (2006.01)
*F16M 11/14* (2006.01)
*F16M 13/02* (2006.01)

(52) U.S. Cl.
CPC ............... *F16M 11/14* (2013.01); *B60R 1/04* (2013.01); *F16M 13/022* (2013.01)

(58) Field of Classification Search
USPC .................. 248/481; 359/871, 872, 874, 880
See application file for complete search history.

(56) References Cited

U.S. PATENT DOCUMENTS

| 2,089,463 | A | * | 8/1937 | Ritz-Woller | B60R 1/06 248/481 |
| 3,507,562 | A | * | 4/1970 | Kushida | B60R 1/04 359/606 |
| 4,504,165 | A | | 3/1985 | Moeremans | |
| 6,318,870 | B1 | * | 11/2001 | Spooner | B60R 1/086 248/477 |
| 6,540,193 | B1 | | 4/2003 | DeLine | |
| 7,196,836 | B2 | | 3/2007 | Bauer et al. | |
| 8,851,690 | B2 | * | 10/2014 | Uken | G02B 7/182 359/875 |
| 8,960,629 | B2 | | 2/2015 | Rizk et al. | |
| 9,352,691 | B2 | * | 5/2016 | Watson | G02B 7/182 |

(Continued)

OTHER PUBLICATIONS

International Search Report and Written Opinion of the International Searching Authority, or the Declaration, dated May 17, 2018, for International Application No. PCT/US2018/012513, filed Jan. 5, 2018, 8 pages.

*Primary Examiner* — Alfred J Wujciak
(74) *Attorney, Agent, or Firm* — Price Heneveld LLP; Bradley D. Johnson (57) ABSTRACT

A socket for a vehicle assembly is disclosed. The socket comprises a mounting structure comprising a plurality of side portions forming a first frame and a ball receiving structure formed by a second frame. The second frame is disposed within a perimeter of the first frame and comprises a plurality of support beams interconnected with the side portions of the first frame. The socket further comprises a ball mount interface comprising a contoured recess formed in each of the beams. The ball mount interface is configured to receive an exterior surface of a ball to form a ball and socket assembly.

7 Claims, 5 Drawing Sheets

(56) References Cited

U.S. PATENT DOCUMENTS

2003/0137757 A1\* 7/2003 Wachi ................... B60R 1/086
                                                    359/880
2014/0133043 A1   5/2014 Watson \* cited by examiner

BALL MOUNT ASSEMBLY FOR VEHICLE

CROSS-REFERENCE TO RELATED APPLICATION

This application claims priority to and the benefit under 35 U.S.C. § 119(e) of U.S. Provisional Patent Application No. 62/444,461, filed on Jan. 10, 2017, entitled "BALL MOUNT ASSEMBLY FOR VEHICLE COMPRISING RECTANGULAR SOCKET," the entire disclosure of which is hereby incorporated herein by reference.

TECHNOLOGICAL FIELD

The present disclosure relates generally to a vehicle assembly and more particularly to a mounting assembly for a display or mirror for a vehicle.

SUMMARY

In one aspect, a socket for a vehicle assembly is disclosed. The socket comprises a mounting structure comprising a plurality of side portions forming a first frame and a ball receiving structure formed by a second frame. The second frame is disposed within a perimeter of the first frame and comprises a plurality of support beams interconnected with the side portions of the first frame. The socket further comprises a ball mount interface comprising a contoured recess formed in each of the beams. The ball mount interface is configured to receive an exterior surface of a ball to form a ball and socket assembly.

In another aspect, a vehicle assembly is disclosed. The assembly comprises a rearview display disposed in a housing and a ball mount assembly adjustably connecting the housing to a portion of a vehicle. The ball mount assembly comprises a ball and a mounting structure comprising a plurality of side portions forming a first frame. A second frame is disposed within a perimeter of the first frame and forms a ball receiving structure configured to receive the ball. The ball mount assembly further comprises a ball mount interface comprising an aperture formed in each of the beams. The ball mount interface is configured to receive an exterior surface of the ball to form a ball and socket assembly.

In yet another aspect, a socket for a vehicle assembly is disclosed. The socket comprises a mounting structure comprising a plurality of side portions forming a first rectangular frame and a ball receiving structure formed by a second rectangular frame. The second rectangular frame is disposed within a perimeter of the first rectangular frame. The second rectangular frame is offset 45 degrees from the first frame about the engaging axis comprising a plurality of support beams interconnected with the side portions of the first frame. The socket further comprises a ball mount interface comprising a relief aperture surrounded by a contoured recess formed in each of the beams. The ball mount interface is configured to receive an exterior surface of a ball to form a ball and socket assembly.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
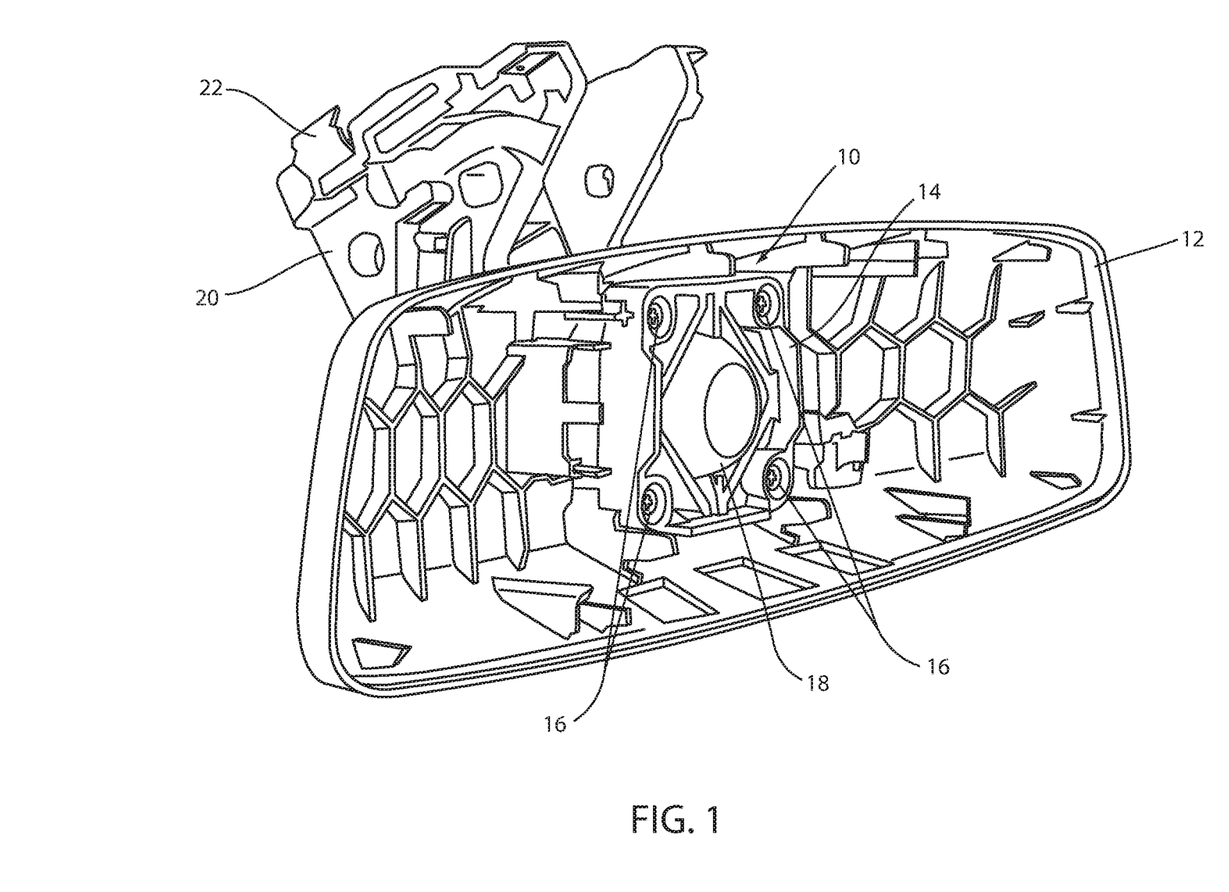
FIG. 1 is a projected assembly view of a ball mount assembly for a vehicular mirror and/or display.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a projected view of a ball mount assembly 10 configured to support a vehicular mirror and/or display in a housing 12 is shown. The housing 12 may correspond to a rear housing, which may interconnect with the ball mount assembly 10 via a socket 14 or mounting joint. The socket 14 may be connected to the housing 12 by a plurality of fasteners 16. The fasteners 16 may correspond to various fasteners and/or fastening agents configured to affix the socket 14 to the housing 12. The mirror or display may correspond to a reflective, rearview display and/or a video display incorporated in the housing 12. The video display may correspond to a liquid crystal display (LCD), light emitting diode (LED) display, or various display technologies which may be configured to display video data of a rearward directed field of view from the vehicle.

The ball mount assembly 10 may further comprise a ball 18 configured to adjustably connect to the socket 14. The ball 18 may be supported by a mounting body 20, which may further interconnect to a windshield of a vehicle via a button (not shown). The mounting body 20 may interconnect with the button with a spring clip 22. In this configuration, the ball mount assembly 10 may be configured to support the housing 12 from a windshield of a vehicle such that the housing 12 may orbitally adjust about the ball mount assembly 10. Though described as being interconnected via the windshield of a vehicle, the ball mount assembly 10 may also be utilized to connect the housing 12 to a roof portion or various other portions of the vehicle.

Figure 2:
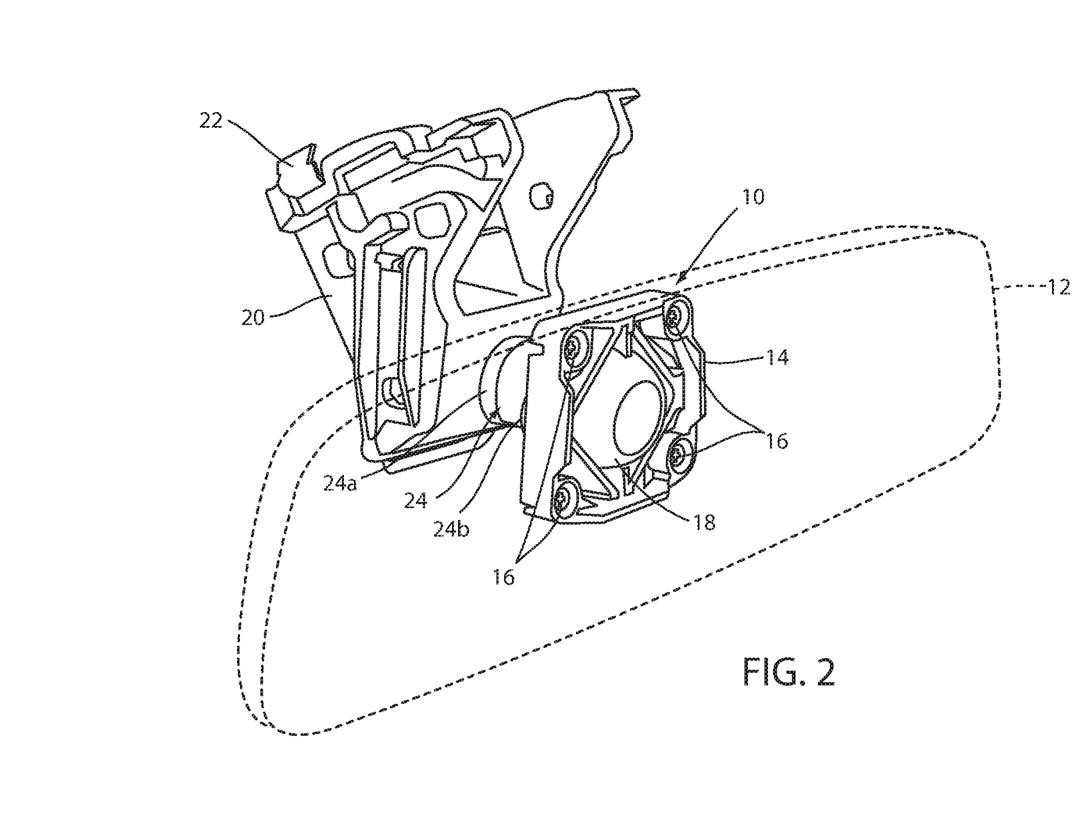
FIG. 2 is a projected view of a ball mount assembly with a rear housing of the mirror or display displayed in hidden lines.

Referring now to FIG. 2, a projected view of the ball mount assembly 10 is shown with the housing 12 demonstrated in phantom lines. As demonstrated, the mounting body 20 may form a neck portion 24. The neck portion 24 may extend from a proximal end portion 24a to a distal end portion 24b. The ball 18 may extend from the distal end portion 24b of the neck portion 24. In this configuration, the ball 18 may interconnect with the socket 14 to support the housing 12 suspended from a roof portion, a windshield, or various portions of the vehicle.

Figure 3:
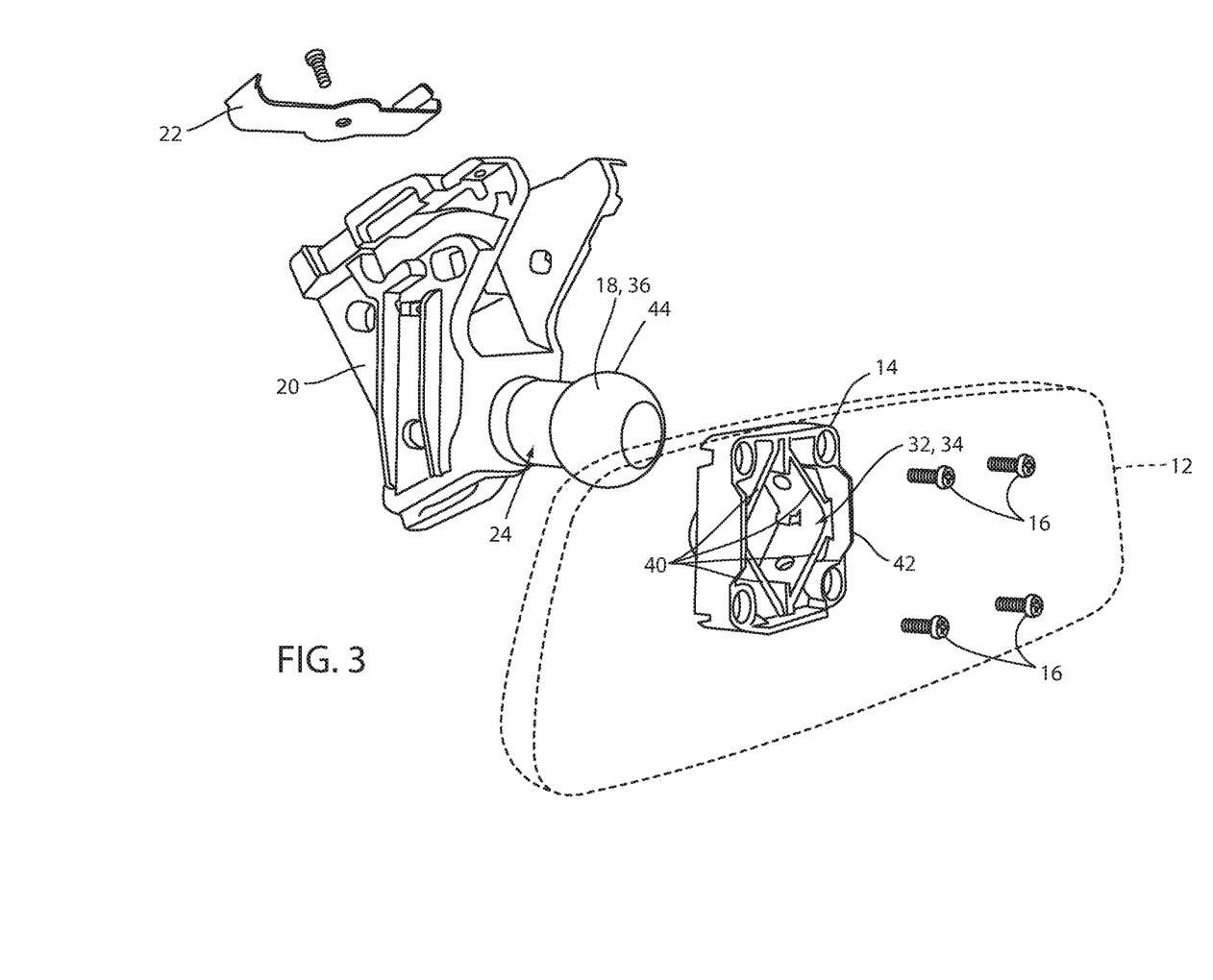
FIG. 3 is a partially exploded assembly view of a ball mount assembly.

Referring now to FIG. 3, an exploded assembly view of the ball mount assembly 10 is shown. In a typical assembly operation, the housing 12 may be fastened to the socket 14 via the plurality of fasteners 16. The housing 12 and the socket 14 may then be pressed together with the ball 18. A ball receiving structure 32 of the socket 14 may form a ball mount interface 34 configured to receive an exterior surface 36 of the ball 18. In this way, the socket 14 may be configured to form an interference fit between the exterior surface 36 of the ball 18 and ball mount interface 34.

The ball mount interface 34 may comprise a plurality of support beams 40, which may be interconnected with a box structure 42 or housing mounting structure. The ball mount interface 34 may be rotationally offset approximately 45 degrees from the box structure 42. In this configuration, the support beams 40 may be arranged such that a parting line 44 of the ball 18 may not interfere with the motion of the socket 14. The parting line may be a product of a manufacturing process utilized to produce the ball 18. The offset between the support beams 40 and the box structure 42 may additionally provide for the ball receiving structure 32 to create an interference fit with the exterior surface 36 of the ball 18 substantially independent of a structural design of the box structure 42. Further details regarding the socket 14 comprising the ball receiving structure 32 and the box structure 42 are further discussed in reference to FIGS. 4-8.

Figure 4:
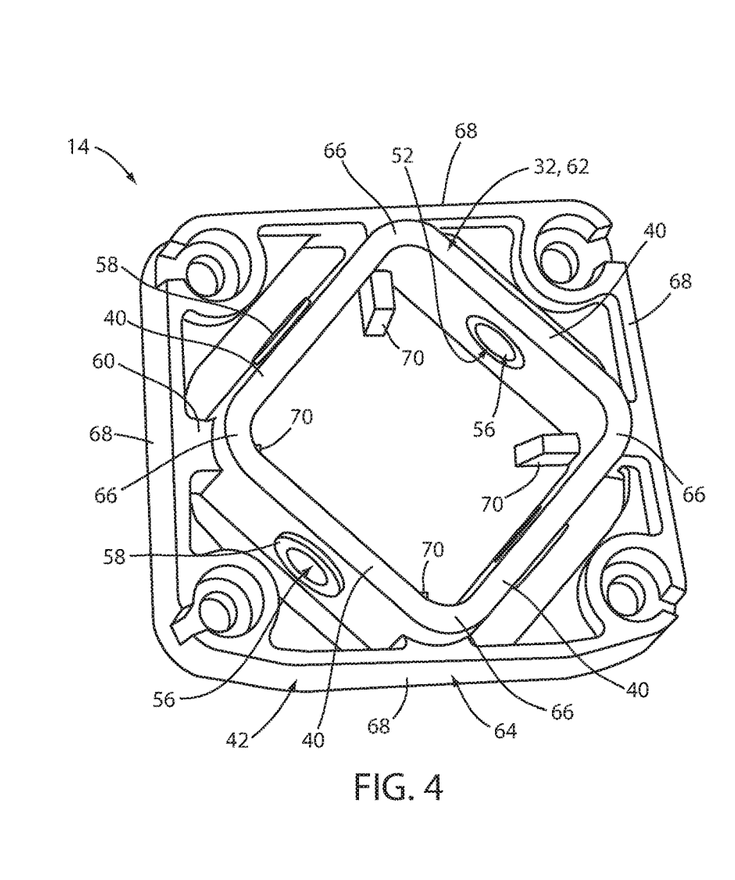
FIG. 4 is a projected view of a socket configured to engage a ball of a ball mount assembly.
Figure 5:
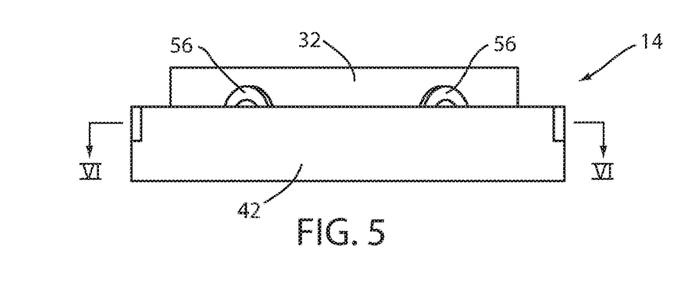
FIG. 5 is a front view of the socket demonstrated in FIG. 4.
Figure 6:
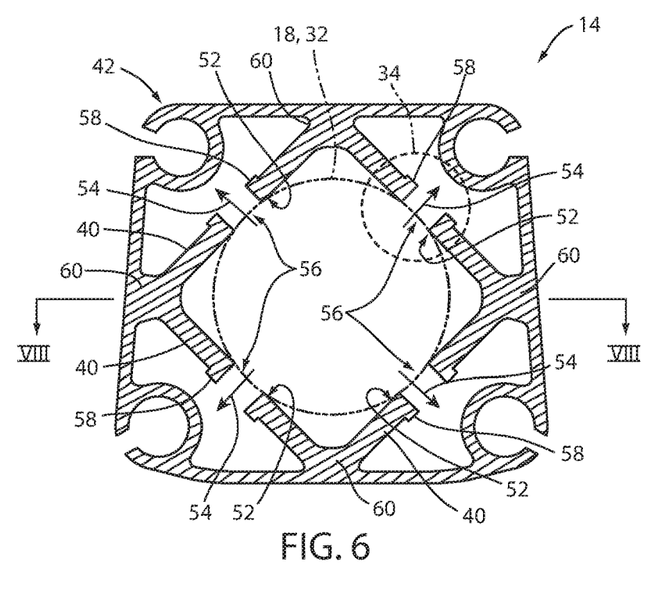
FIG. 6 is a cross-sectional view of the socket demonstrated in FIG. 4 sectioned along section A-A as depicted in FIG. 5.

Referring now to FIGS. 4, 5, and 6; the socket 14 is now discussed in further detail. FIG. 4 demonstrates a detailed projected view of the socket 14. FIG. 5 demonstrates a front view of the socket 14 including section lines A-A. FIG. 6 demonstrates a sectional view of the socket 14 sectioned along section line A-A as depicted in FIG. 5.

As discussed previously, the socket 14 may comprise a housing mounting structure in the form of the box structure 42. The box structure 42 may be configured to connect to the housing via the plurality of fasteners 16. The socket 14 may further comprise the ball receiving structure 32 including the ball mount interface 34. The ball mount interface 34 may comprise a plurality of contoured recesses 52 which may be configured to engage the exterior surface 36 of the ball 18 such that a deflection draws at each of the support beams 40. The deflection of the beams 40 may be a result of a beam deflection 54 illustrated by the arrows in FIG. 6.

The ball mount interface 34 may provide for a preload to be applied to the exterior surface 36 of the ball 18. The preload and the friction between the ball mount interface 34 and the exterior surface 36 may result in a resistive force applied by the surface of the contoured recesses 52 to the exterior surface 36. In this configuration, the socket 14 engaged with the ball 18 may support the housing 12 such that an external force from a passenger of a vehicle (e.g. a torque or rotation applied by a hand of a passenger) may be required to adjust the position of the housing 12. Though specific geometric relationships and elements are discussed in reference to the exemplary embodiments, such embodiments shall not be considered limiting to the scope of the disclosure. Accordingly, the disclosure may provide for a variety of embodiments to suit a number of applications without departing from the spirit of the disclosure.

The contoured recesses 52 of the ball mount interface 34 may correspond to spherical recesses or cups in the form of recessed surfaced features. In some embodiments, the contoured recesses 52 may form a complementary diameter and corresponding surface contour of the exterior surface 36 of the ball 18. In addition to the contoured recesses 52, each of the ball mount interfaces 34 may further comprise a relief aperture 56 and a reinforcement rib 58.

The relief aperture 56 may correspond to a hole formed through a structure of the beam 40 and may provide for an empty volume of space to receive a maximum extent of the exterior surface 36 of the ball 18 in an assembled configuration. In this way, the ball mount interface 34 may provide for a first resistive force to be applied by the beams 40 to the exterior surface 36 of the ball 18 during an assembly operation. Additionally, the ball mount interface 34 may provide for a second resistive force to be applied by the contoured recesses 52 of the beams 40 to the exterior surface 36 of the ball 18 in an assembled configuration.

The first resistive force may be greater than the second resistive force allowing for the socket 14 to be adjusted about the ball 18 while maintaining the assembled configuration of the ball mount assembly 10. The first resistive force may be greater due to a decreased pressure applied to the exterior surface 36 as a result of a relief provided by the contoured recesses 52. The relief provided by the contoured recesses 52 may limit the deflection of the beams 40 and the corresponding pressure applied to the exterior surface 36 in the assembled configuration. Accordingly, the ball mount interface 34 may provide for the orientation of the ball mount assembly 10 to be adjusted by receiving an applied force exceeding the second resistive force, while retaining the ball 18 in the assembled configuration by a greater, first resistive force.

The reinforcement ribs 58 may correspond to an annular ring configured to provide structural support to the beams 40 to control the force required to cause the beam deflections 54. Accordingly, each of the contoured recesses 52, the relief aperture 56, and the reinforcement ribs 58 in combination with the dimensions and material of the beams 40 may determine the force applied by the ball mount interfaces 34 to the ball 18. In this way, the dimensions of the ball receiving structure may be adjusted to change the force applied by the socket 14 proportionate to the beam deflections 54.

Each of the beams 40 may further connect to a lateral support 60 configured to interconnect a first rectangular frame 62 of the ball receiving structure 32 with a second rectangular frame 64 of the box structure 42. In this configuration, each of the lateral supports 60 may connect to a corner portion 66 of the first rectangular frame 62 to a side portion 68 of the second rectangular frame 64. In this way, the ball receiving structure 32 comprising the first rectangular frame 62 may be offset at approximately 45 degrees from the second rectangular frame 64 of the box structure 42. Accordingly, the force applied by the ball mount interfaces 34 from the beams 40 may be substantially independent of the structural design of the box structure 42 of the socket 14.

In addition to the ball mount interface 34, the ball receiving structure 32 may further comprise a plurality of protruding ribs 70. In an exemplary embodiment, the protruding ribs 70 may extend from the corner portions 66 of the first rectangular frame 62 proximate to the lateral supports 60. Further details regarding the protruding ribs 70 are further described in reference to FIGS. 7 and 8. Though discussed in reference to specific angles (e.g. the 45 degree offset between the first rectangular frame 62 and the second rectangular frame 64), the socket 14 may be configured in various geometric configurations to provide similar benefits to those discussed herein.

For example, a triangular configuration may be utilized similar to the first rectangular frame 62 and the second rectangular frame 64. In such a configuration, the socket 14 may comprise a first triangular frame and a second triangular frame offset by approximately 60 degrees. Similarly, additional geometric configurations may be utilized to provide for similar structural designs for the ball receiving structure 32 without departing from the spirit of the disclosure. In each of the geometric variations an approximate ratio of a number of sides of the frames 62 and 64 to the offset angle between the frames may be maintained. For example, the offset may be approximately equal to 180 degrees divided by the number of sides of the frames. Accordingly, for the first rectangular frame 62 and the second rectangular frame 64, the offset is approximately 45 degrees. For a first pentagonal frame and a second pentagonal frame, the offset may be approximately 36 degrees. In this way, an offset between geometry of the first frame and the second frame may provide for equal distribution of the force applied by the ball mount interfaces 34 to the ball 18 along each of the beams 40.

The ball mount assembly 10 may be formed or manufactured from a substantially rigid material, which may correspond to a polymeric, metallic, or various other rigid materials. The socket 14 may correspond to a semi-flexible polymeric material which may correspond to acetal or various other similar materials. In this configuration, the socket 14 may deform about the exterior surface 36 of the ball during an assembly operation. Additionally, when assembled, the semi-flexible polymeric material may provide for the preload to be applied by the ball mount interface 34 to the exterior surface 36 of the ball 18 as a result of the elastic properties of the material utilized for the socket 14.

Figure 7:
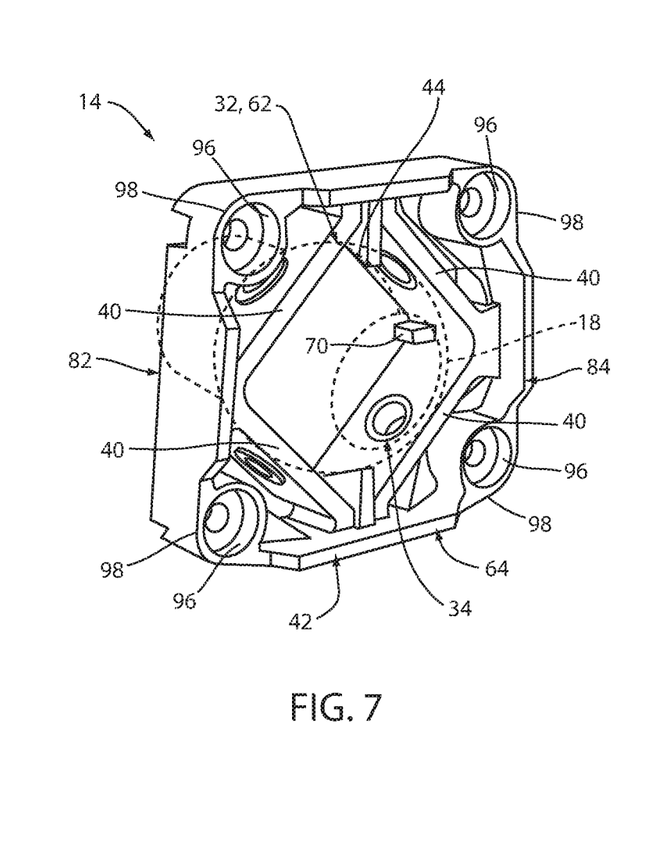
FIG. 7 is a projected view of a socket demonstrating a ball comprising a parting line demonstrated in hidden lines.
Figure 8:
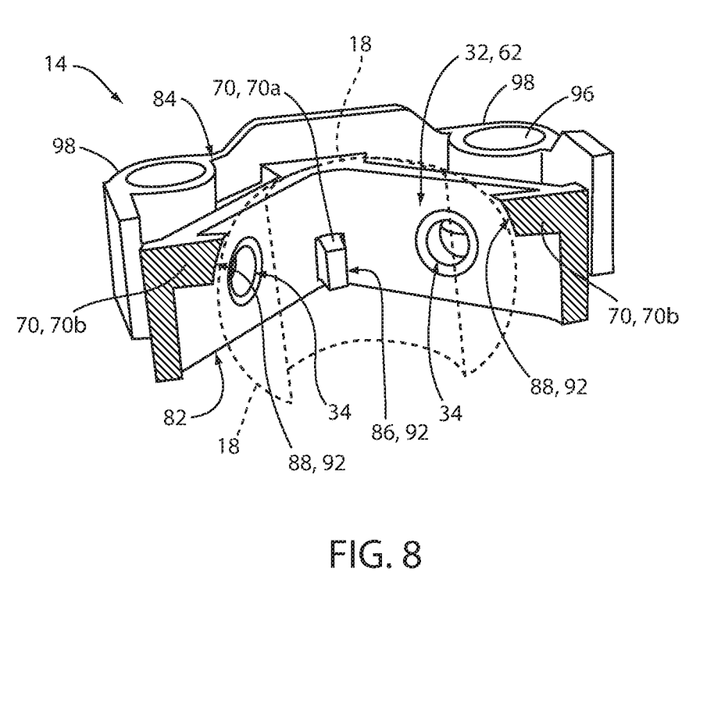
FIG. 8 is a projected cross-sectional view of the socket depicted in FIG. 7 sectioned along section line B-B as depicted in FIG. 6.

Referring now to FIGS. 7 and 8, a projected view of the socket 14 is demonstrated showing the ball 18 in hidden lines. As demonstrated in FIGS. 7 and 8, the mating configuration of the ball 18 with the ball receiving structure 32 is demonstrated in further detail. For example, during an assembly operation, the exterior surface 36 of the ball may be pressed into the ball receiving structure 32. In order to engage the ball mount interface 34, the ball 18 may be forced from a first side 82 toward a second side 84 of the socket 14. When entering from the first side 82, the ball 18 may be forced passed a first retention feature 86 formed by a first pair 70a of the protruding ribs 70 proximate the first side 82 of the socket 14. Additionally, to prevent the ball 18 from passing through the socket 14, a second retention feature 88 may be formed of a second pair 70b of the protruding ribs 70. In this configuration, the first pair of protruding ribs 70a may prevent unintended removal of the ball 18 from the socket 14 while the second pair of protruding ribs 70b may prevent the ball 18 from passing through the socket 14.

In an assembled configuration, wherein the exterior surface 36 of the ball 18 is seated within the ball mount interface 34 (e.g. seated within the contoured recess 52), the retention features 86, 88 may provide for a clearance between each of the protruding ribs 70 and the exterior surface 36 of the ball 18. In this way, the retention features 86, 88 may not contact the exterior surface 36 of the ball 18 in the assembled configuration while providing for the retention of the ball 18 within the socket 14.

Each of the protruding ribs 70 may comprise a contoured end portion 92 disposed proximate a distal end. The contoured end portions 92 may be formed to have a complementary surface configured to substantially match a surface angle and/or curvature of the exterior surface 36 in an assembled configuration. In some embodiments, the contoured end portions 92 may form round or spherical contours configured to complement the exterior surface 36 to maintain a clearance from the ball 18. In this way, the socket 14 may provide for the retention features 86, 88 to retain the ball 18 while still maintaining control of the movement of the socket 14 about the ball 18 via the ball mount interface 34 on the beams 40.

Also demonstrated in FIG. 7, the box structure 42 may be configured to form a plurality of reinforced attachment features 96. The reinforced attachment features 96 may correspond to apertures, which may comprise structural ribs 98 configured to receive and support the plurality of fasteners 16. In this configuration, the socket 14 may be connected to the housing 12 such that the housing 12 may be adjusted proportionally to the socket 14 about the ball 18. Though specific examples of the ball mount assembly 10 are discussed herein, such examples should only be considered as exemplary embodiments to promote understanding of the disclosure. Accordingly, the ball mount assembly 10 may be configured in a variety of ways without departing from the spirit of the disclosure.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle assembly for supporting a rearview display comprising:
   the rearview display disposed in a housing;
   a ball mount assembly adjustably connecting the housing to a portion of a vehicle, wherein the ball mount assembly comprises:
   a ball;
   a mounting structure comprising a plurality of side portions forming a first frame;
   a ball receiving structure comprising a plurality of beams, the ball receiving structure configured to receive the ball and formed by a second frame disposed within a perimeter of the first frame; and
   a ball mount interface comprising an aperture formed in each of the beams, wherein the ball mount interface is configured to receive an exterior surface of the ball to form a ball and socket assembly.

2. The vehicle assembly according to claim 1, wherein the rearview display comprises at least one of a video display device and a rearward directed mirror.

3. The vehicle assembly according to claim 1, wherein the second frame comprises a plurality of support beams interconnected with the side portions of the first frame.

4. The vehicle assembly according to claim 1, wherein the ball mount interface further comprises a contoured recess formed in at least one of the beams and extending around a perimeter of the apertures.

5. The vehicle assembly according to claim 1, wherein the first frame and the second frame each comprise a like number of sides and are offset about the engaging surface by 180 degrees divided by the number of sides.

6. The vehicle assembly according to claim 1, further comprising a plurality of ribs protruding into an opening formed by the ball mount interface from the first frame.

7. The vehicle assembly according to claim 6, wherein each of the protruding ribs forms an end portion spaced from the ball in an assembled configuration with the socket.

* * * * *